United States Patent [19]
Caye et al.

[11] Patent Number: 5,961,177
[45] Date of Patent: *Oct. 5, 1999

[54] SUNROOF ASSEMBLY DRAIN TROUGH FOR AN AUTOMOTIVE VEHICLE

[75] Inventors: Mark A. Caye, Allen Park; David A. Smith, Macomb Township, Macomb County, both of Mich.

[73] Assignee: ASC Incorporated, Southgate, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/779,926

[22] Filed: Jan. 6, 1997

Related U.S. Application Data

[63] Continuation of application No. PCT/US94/07716, Jul. 5, 1994.

[51] Int. Cl.$^6$ ............................................................ B60J 7/00
[52] U.S. Cl. .................. 296/213; 296/216.02; 296/221; 296/222
[58] Field of Search .................................. 296/213, 216, 296/220, 221, 222; 49/476.1

[56] References Cited

U.S. PATENT DOCUMENTS

| | | | |
|---|---|---|---|
| 3,638,372 | 2/1972 | Rosenthal | 49/476.1 |
| 3,955,848 | 5/1976 | Lutz et al. | |
| 4,185,868 | 1/1980 | Kaltz et al. | |
| 4,257,646 | 3/1981 | Schatzler | 296/222 |
| 4,420,184 | 12/1983 | Kaltz | 296/221 |
| 4,556,835 | 12/1985 | Vogel et al. | |
| 4,566,730 | 1/1986 | Knabe et al. | 296/221 |
| 4,601,091 | 7/1986 | Grimm et al. | 296/221 |
| 4,601,512 | 7/1986 | Boots | 296/221 |
| 4,619,480 | 10/1986 | Motoyama et al. | 296/217 |
| 4,626,023 | 12/1986 | Lutz | 296/216 |
| 4,630,860 | 12/1986 | Fuerst et al. | 296/217 |
| 4,643,478 | 2/1987 | Boots | 296/221 |
| 4,647,106 | 3/1987 | Furst | 296/223 |
| 4,664,439 | 5/1987 | Schaetzler et al. | 296/213 |

(List continued on next page.)

FOREIGN PATENT DOCUMENTS

| | | | |
|---|---|---|---|
| 0290106 | 11/1988 | European Pat. Off. | |
| 1257321 | 2/1969 | France | 296/222 |
| 1480500 | 10/1969 | Germany | 296/222 |
| 1946161 | 3/1971 | Germany | |
| 2234852 | 1/1974 | Germany | |
| 2318391 | 10/1974 | Germany | |
| 1946161 B2 | 1/1978 | Germany | |
| 3149977 | 6/1983 | Germany | 296/220 |
| 3603314A | 8/1987 | Germany | 296/222 |

(List continued on next page.)

OTHER PUBLICATIONS

"Ford 1973 Car Shop Manual", Vol. 4 Body, Ford Marketing Corporation, pp. 46–10–01 through 46–10–8, 46–11–01 through 46–11–07.

A.K. Legg, SAAB Owners Workshop Manual, 1981, 1986, pp. 240 and 241.

ASC drawing No. C–49X5–0001–AXXX entitled "Housing Assembly–Complete" (Mar. 24, 1995).

*Primary Examiner*—Dennis H. Pedder
*Attorney, Agent, or Firm*—Harness, Dickey & Pierce, P.L.C.

[57] ABSTRACT

A sunroof assembly (20) of an automotive vehicle employs dual sunroof panes, a pair of movable sunshades and a control system for operating the function thereof. In one aspect of the present invention, a sunroof assembly provides a substantially transparent front pane (22) which is slidable from a covering position to a retracted position and a substantially transparent rear pane (24) movable from a covering position to an open position. In another aspect of the present invention, a sunroof assembly (20) provides a pair of substantially transparent panes in combination with a front sunshade (26) and a rear sunshade (28). The sunshades are movable from a functional position to a stowed position. In a further aspect of the present invention, a control system (32) provides an electric switch assembly (30), electrical circuit and software for operating the panes and sunshades.

12 Claims, 9 Drawing Sheets

U.S. PATENT DOCUMENTS

| | | | |
|---|---|---|---|
| 4,671,564 | 6/1987 | Sumida et al. | 296/214 |
| 4,679,846 | 7/1987 | Lux et al. | 296/214 |
| 4,684,169 | 8/1987 | Igel et al. | 296/221 |
| 4,699,421 | 10/1987 | Schaetzler et al. | 296/221 |
| 4,709,959 | 12/1987 | Paerisch et al. | 296/217 |
| 4,746,165 | 5/1988 | Fuerst et al. | 296/216 |
| 4,749,227 | 6/1988 | Bienert et al. | 296/221 |
| 4,811,985 | 3/1989 | Kruger et al. | 296/214 |
| 4,835,449 | 5/1989 | Huehn | 218/282 |
| 4,869,548 | 9/1989 | Nagata et al. | 296/221 |
| 4,883,311 | 11/1989 | Kohlpaintner et al. | 296/213 |
| 4,910,445 | 3/1990 | Borrmann | 318/468 |
| 4,911,496 | 3/1990 | Fuerst | 296/220 |
| 4,923,246 | 5/1990 | Takahashi et al. | 296/221 |
| 4,941,706 | 7/1990 | Jardin | 296/213 |
| 4,946,225 | 8/1990 | Jardin | 296/213 |
| 4,978,165 | 12/1990 | Schreiter et al. | 296/216 |
| 4,982,995 | 1/1991 | Takahashi | 296/221 |
| 4,995,665 | 2/1991 | Ichinose et al. | 296/213 |
| 5,018,783 | 5/1991 | Chamings et al. | 296/219 |
| 5,026,113 | 6/1991 | DiCarlo et al. | 296/221 |
| 5,029,937 | 7/1991 | Yamamoto | 296/223 |
| 5,044,222 | 9/1991 | Tanaka et al. | 74/500.5 |
| 5,069,500 | 12/1991 | Reihl et al. | 296/214 |
| 5,085,622 | 2/1992 | Kohlpaintner et al. | 296/222 |
| 5,090,767 | 2/1992 | Schreiter et al. | 296/216 |
| 5,104,178 | 4/1992 | Bienert | 296/216 |
| 5,106,149 | 4/1992 | Glossup, Jr. et al. | 49/476.1 |
| 5,141,283 | 8/1992 | Omoto et al. | 296/219 |
| 5,154,482 | 10/1992 | Hayashi et al. | 296/223 |
| 5,184,870 | 2/1993 | Bauhof | 296/223 |
| 5,197,779 | 3/1993 | Mizuno et al. | 296/220 |
| 5,248,278 | 9/1993 | Fuerst et al. | 454/129 |
| 5,250,882 | 10/1993 | Odoi et al. | 296/223 X |
| 5,288,125 | 2/1994 | Huyer | 296/216 |
| 5,335,961 | 8/1994 | Reinsch et al. | 296/213 |
| 5,405,185 | 4/1995 | Cheron et al. | 296/223 |
| 5,447,355 | 9/1995 | Kelm | 296/223 |
| 5,516,187 | 5/1996 | Zani et al. | 296/223 |

FOREIGN PATENT DOCUMENTS

| | | | |
|---|---|---|---|
| 3802379A1 | 8/1988 | Germany. | |
| 3822258A1 | 3/1989 | Germany. | |
| 3813049 A | 11/1989 | Germany | 296/222 |
| 3840119 A | 5/1990 | Germany | 296/224 |
| 3900361 A | 7/1990 | Germany. | |
| 3930054 | 3/1991 | Germany | 296/216 |
| 4124505A1 | 10/1992 | Germany. | |
| 58-218423 | 12/1958 | Japan. | |
| 3197232A | 8/1991 | Japan. | |
| 524437A | 2/1993 | Japan. | |
| 2047636 | 12/1980 | United Kingdom | 296/222 |
| 2077461 | 12/1981 | United Kingdom | 296/221 |
| 2295801 | 6/1996 | United Kingdom. | |
| WO 94/25301 | 11/1994 | WIPO. | |

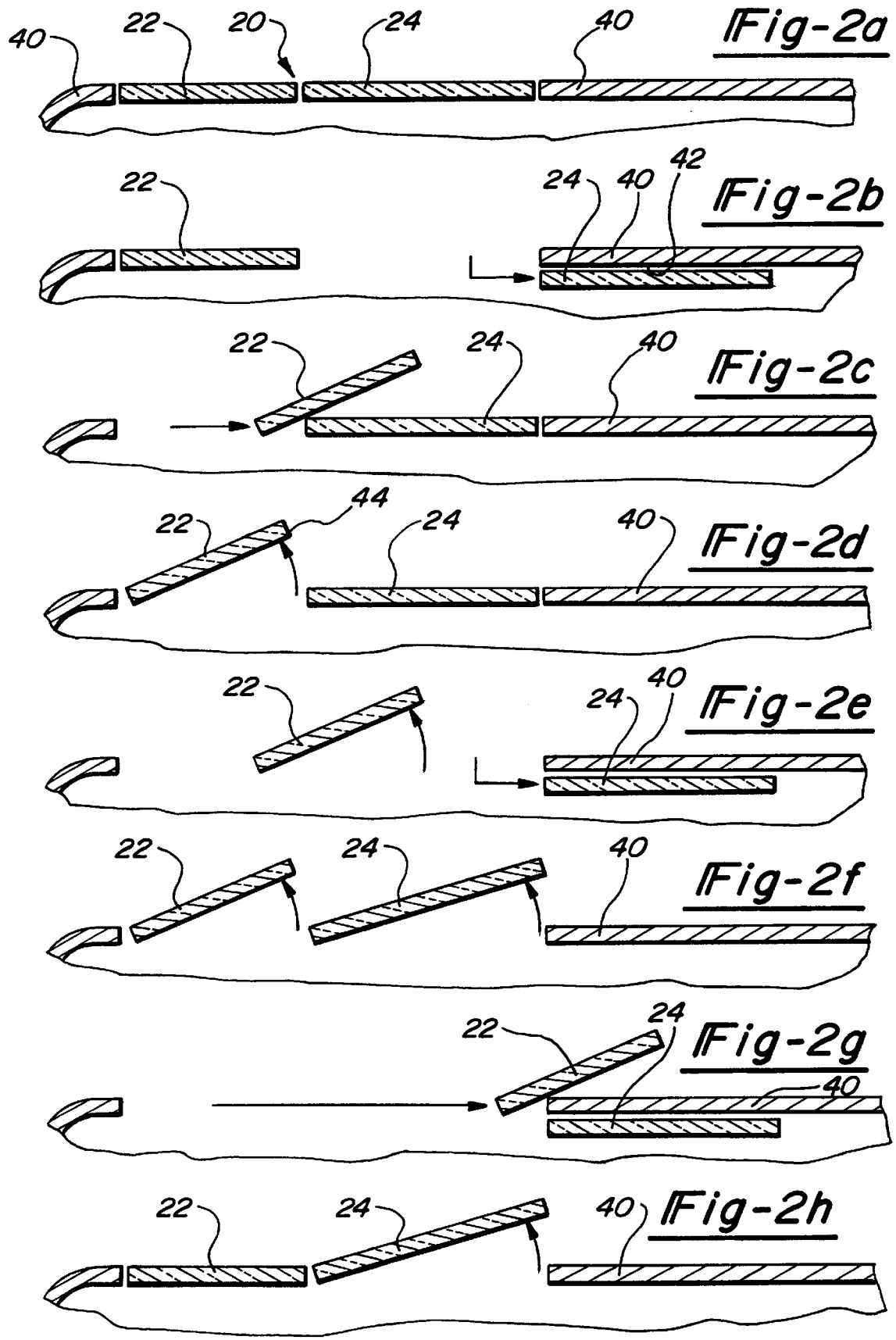

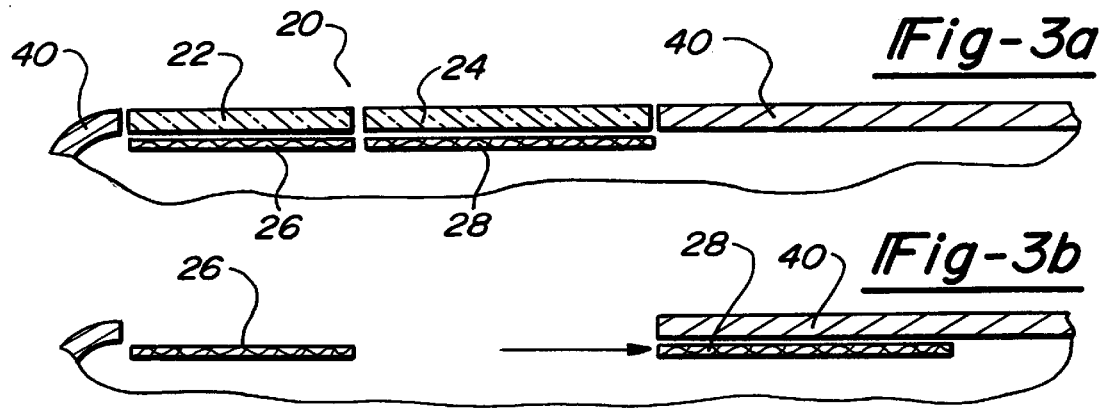
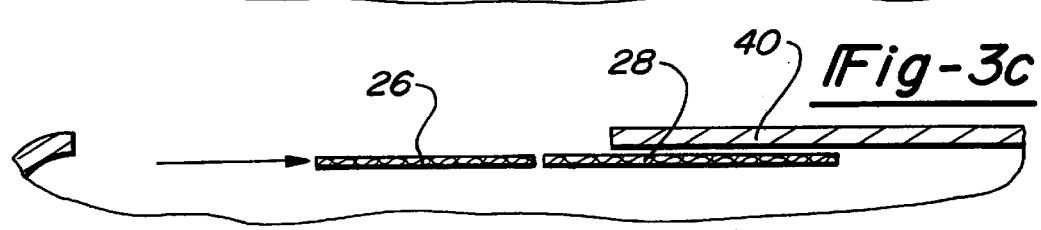
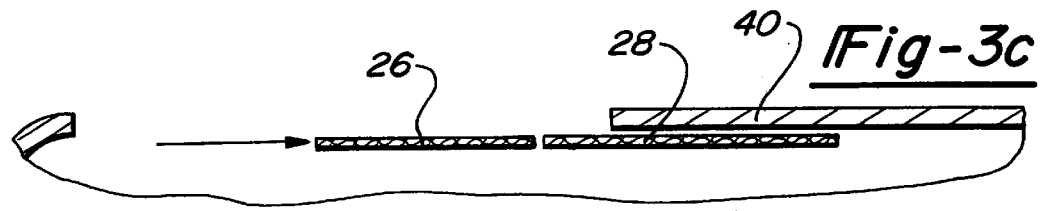
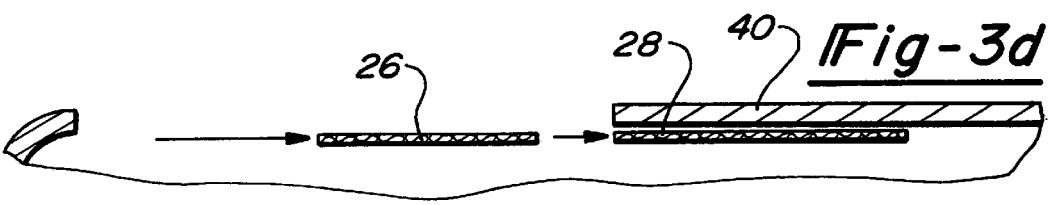
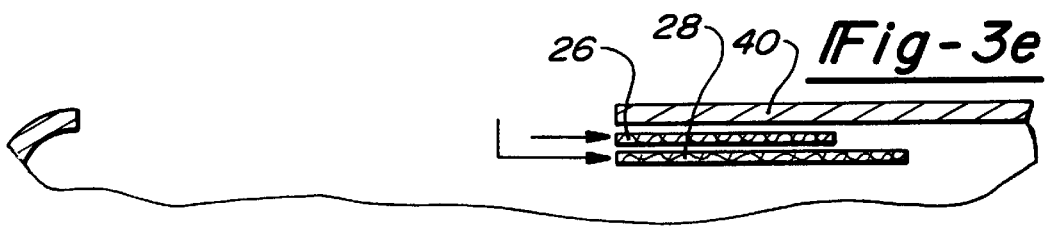
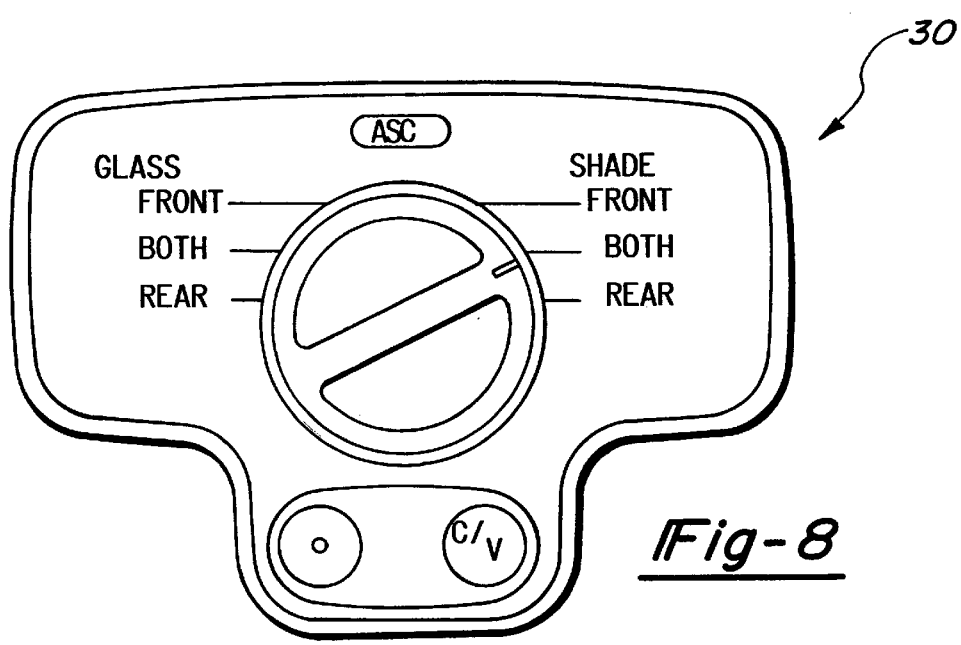

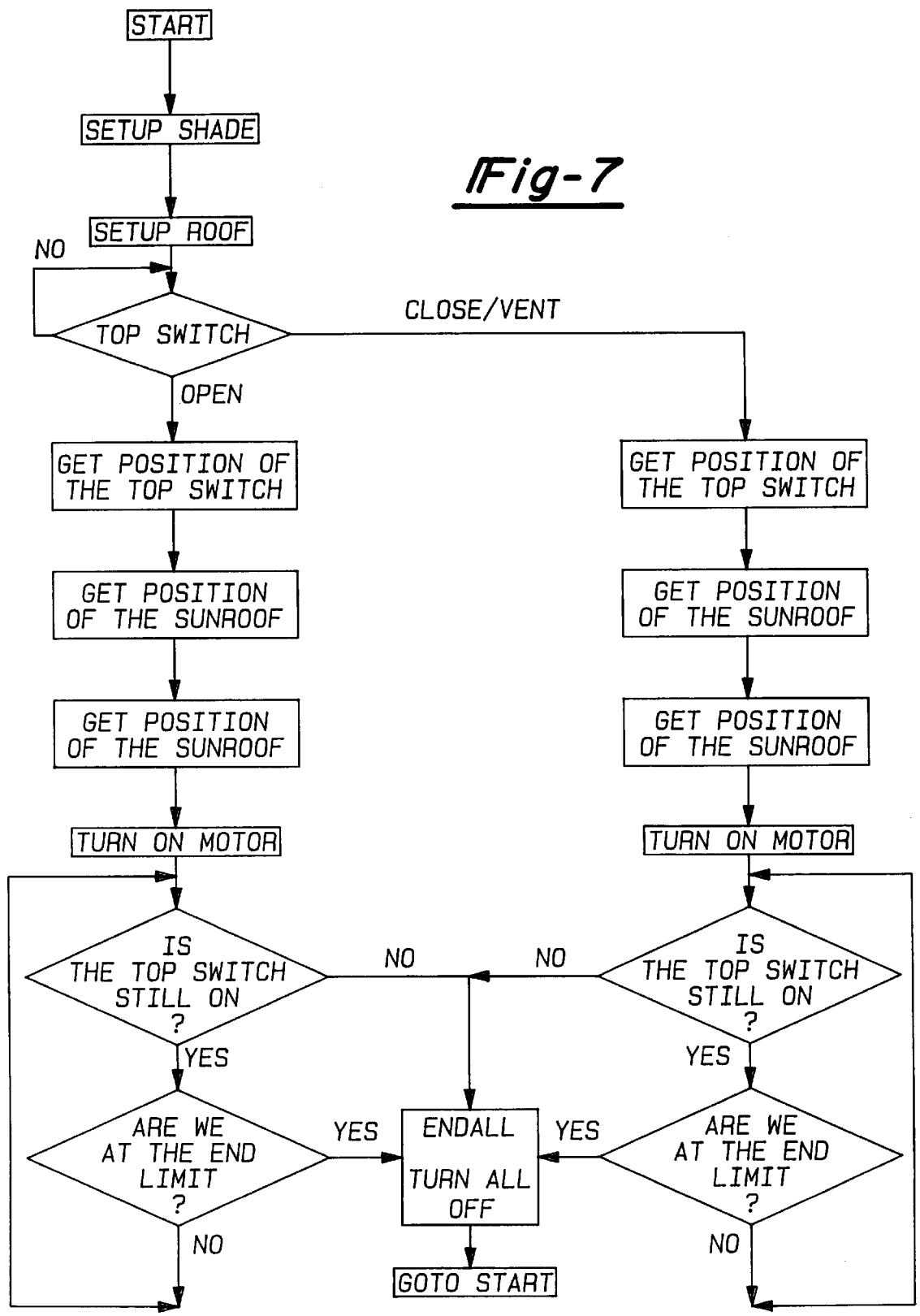

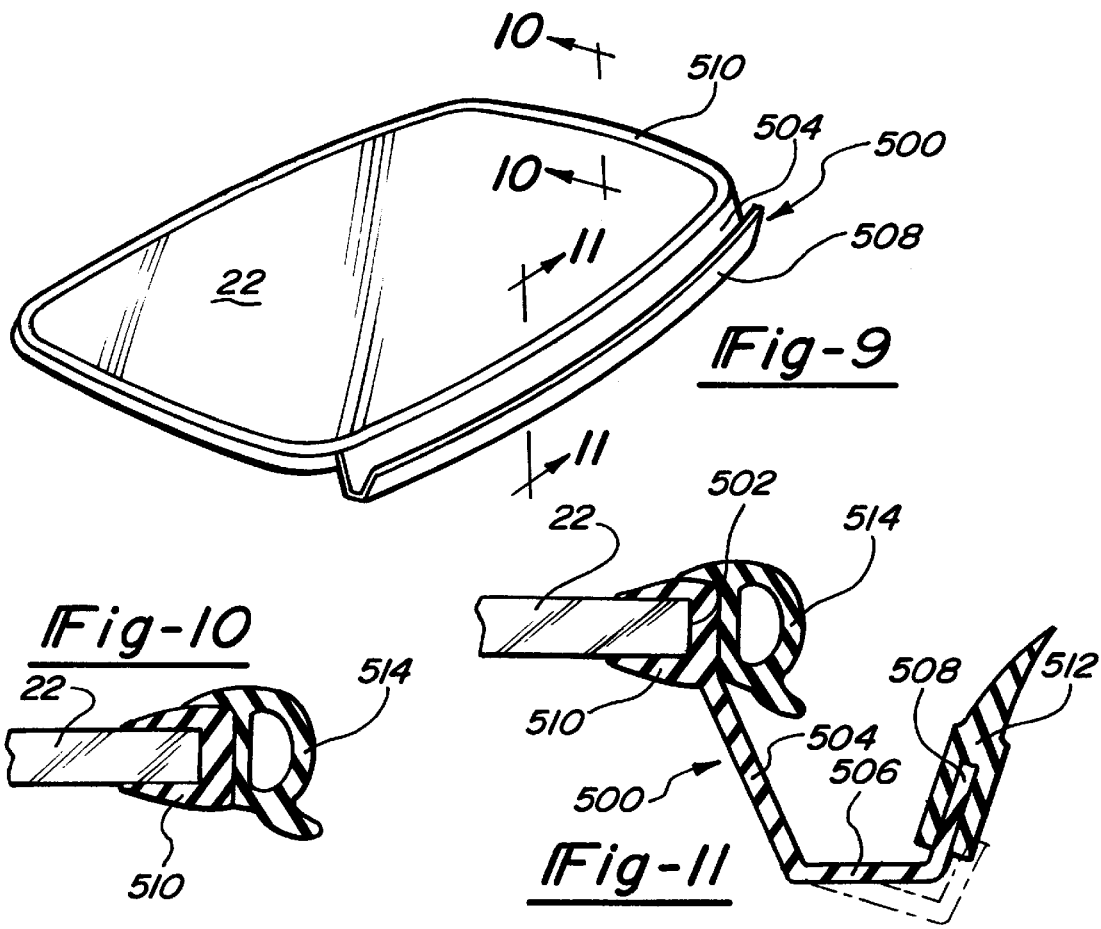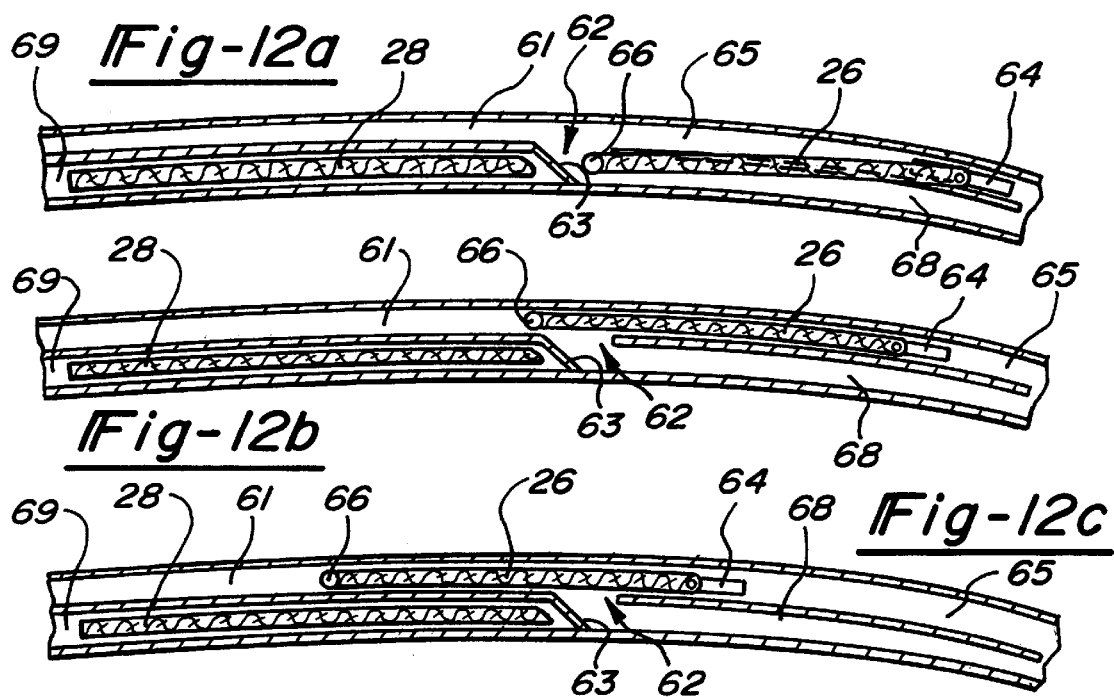

SUNROOF ASSEMBLY DRAIN TROUGH FOR AN AUTOMOTIVE VEHICLE

This is a continuation of U.S. patent application Ser. No. PCT/US94/07716, filed Jul. 5, 1994, which designated the United States.

BACKGROUND AND SUMMARY OF THE INVENTION

This invention relates generally to sunroof assemblies for automotive vehicles and specifically to a dual sunroof assembly and a control system for operating same.

It is common knowledge to provide a single sunroof within a stationary roof of an automotive vehicle. These traditional sunroofs typically employ a transparent glass pane slidable from a covering position, somewhat flush to the roof, to a retracted position, which allows sunlight and ventilation access through an opening within the roof. Another traditional sunroof construction provides a transparent glass pane which is tiltable from a closed position to a pivoted venting position. This allows air from within the vehicle to pass through an opening created between the vented pane and the roof. A single sliding interior sunshade has also been employed with various of these sunroofs. Such sunshades are typically horizontally oriented and slidably movable to expose or cover a sunroof.

It is also known by those in the automotive industry to provide a pivotable wind deflector in front of a sliding spoiler-type sunroof. Such a construction is disclosed within U.S. Pat. No. 4,659,140 entitled "Vehicle Roof" which issued to Fuerst et al. on Apr. 21, 1987, and U.S. Pat. No. 5,069,501 entitled "Spoiler Control Mechanism" which issued to Baldwin et al. on Dec. 3, 1991, the disclosures of which are incorporated by reference herewithin. However, wind deflectors of this type merely pivot and do not slide to a retracted position. Thus, such a wind deflector limits the roof opening that would otherwise be disposed above the front seat occupants.

U.S. Pat. No. 4,786,102 entitled "Sun Roof Apparatus of Vehicle Roof" which issued to Sakamoto et al. on Nov. 22, 1988, attempts to further increase the effective roof opening, especially above the front seat, by employing a pair of movable covering panels. This device provides a rear cover panel which is detachably removable such that a front cover panel can be rearwardly slid. Provisions are also made for manually mounting the removed rear cover panel upon the retracted front cover panel. However, this system appears ungainly to operate especially while driving the automobile.

U.S. Pat. No. 5,197,779 entitled "Power Sliding Sunroof" which issued to Mizuno et al. on Mar. 30, 1993, discloses a pair of slidable sunroofs mounted in tracks on top of a stationary roof. The disclosure of this patent is incorporated by reference herewithin. However, this non-flush roof system is aesthetically prominent, is prone to excessive wind noise during vehicle driving and will cause excessive aerodynamic drag in all operating positions.

Various manual and motorized driving mechanisms have been used in combination with the aforementioned sunroofs. For motorized actuation, various electrical circuits have been employed to control operation of the operating mechanisms. One such circuit and switch for energizing a motorized drive is disclosed within U.S. Pat. No. 4,556,835 entitled "Operating Mechanism for Movable Parts, Especially for Sliding Roofs and Sliding/Lifting Roofs" which issued to Vogel et al. on Dec. 3, 1985, and is incorporated by reference herewithin. Another such circuit is discussed within UK Patent Application GB 2077461 entitled "Operating Mechanism for Tilting and Sliding Roof Panels." These circuits and switches, however, do not provide a means for controlling a pair of movable panes, a pair of movable sunshades, or any combination thereof.

In accordance with the present invention, the preferred embodiment of a sunroof assembly of an automotive vehicle employs dual sunroof panes, a pair of movable sunshades and a control system for operating the function thereof. In one aspect of the present invention, a sunroof assembly provides a substantially transparent front pane which is slidable from a covering position to a retracted position and a substantially transparent rear pane movable from a covering position to an open position. At least one of the panes is retractable below a stationary roof of the automotive vehicle. In another aspect of the present invention, a sunroof assembly provides a pair of substantially transparent panes in combination with a substantial opaque front sunshade and a substantially opaque rear sunshade. The sunshades are movable from a functional position to a stowed position. In a further aspect of the present invention, a control system provides an electric switch assembly, electrical circuit and software for operating the panes and sunshades. A unique sunshade guide rail system is also provided. The sunroof assembly of the present invention further employs a drain trough attached to a movable pane.

The sunroof assembly of the present invention provides many advantages over conventional sunroof constructions. For example, the present invention sunroof assembly allows for an increased roof opening when the panes are retracted and an increased daylight opening (or glass coverage space) when the panes are in a covering position. The sunroof assembly of the present invention is also easily operable to a fully or partially retracted position even while the vehicle is being driven. The present invention further employs a unique arrangement for stowing a pair of panes and sunshades in order to minimize headroom intrusion below the roof surface without increasing aerodynamic drag, wind noise or unsightliness when the panes are in their covering and unretracted positions. The control system of the present invention is advantageous over conventional systems by providing an easily accessible and operable switch, circuit and software for facilitating easy driver use which is also quite cost effective and efficiently constructed. The present invention control system prevents inadvertent collisions between panes and sunshades. Additional advantages and features of the present invention will become apparent from the following description and appended claims, taken in conjunction with the accompanying drawings.

BRIEF DESCRIPTION OF THE DRAWINGS

FIGS. 2a through 2h are diagrammatic longitudinal sectional views, taken along line 2—2 of FIG. 1, showing the various positions of a preferred embodiment of front and rear panes employed in the present invention sunroof assembly;

FIGS. 3a through 3e are diagrammatic longitudinal sectional views, also taken along line 2—2 of FIG. 1, showing a preferred embodiment of front and rear sunshades employed in the present invention sunroof assembly;

FIG. 7 is a flow chart of a computer process employed to operate the preferred embodiment of the control system and sunroof assembly of the present invention of FIGS. 1 and 6;

FIG. 8 is a true elevational view showing an alternate embodiment of the electrical switch assembly of the present invention of FIG. 4;

FIG. 9 is a perspective view showing a preferred embodiment drain trough attached to a pane of the present invention sunroof assembly of FIG. 1;

FIG. 10 is a sectional view, taken along line 10—10 of FIG. 9, showing the preferred embodiment drain trough of the present invention sunroof assembly;

FIG. 11 is a sectional view, taken along line 11—11 of FIG. 9, showing the preferred embodiment drain trough of the present invention sunroof assembly;

FIGS. 12a–12c are longitudinal sectional views, also taken along line 2—2 of FIG. 1 showing the various positions of the preferred embodiment sunshades in relation to first preferred embodiment sets of guide rails of the present invention sunroof assembly;

DETAILED DESCRIPTION OF THE PREFERRED EMBODIMENTS

Figure 1:
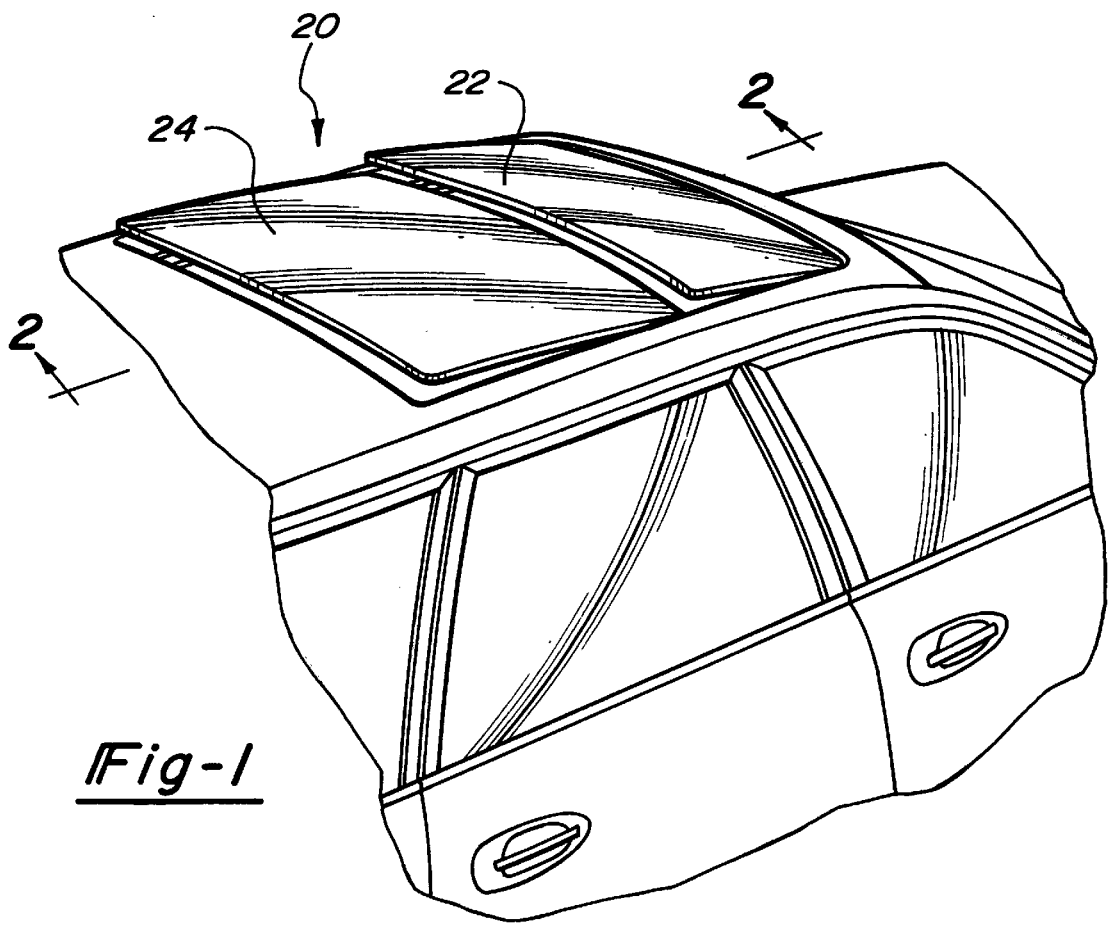
FIG. 1 is a rear perspective view showing a preferred embodiment of a sunroof assembly of the present invention employed in an automotive vehicle.

Referring to FIGS. 1 through 11, a preferred embodiment of a sunroof assembly 20 of the present invention has a front glass pane 22, a rear glass pane 24, a front sunshade 26, a rear sunshade 28, an operating mechanism, an electric switch assembly 30, a control system 32 and a drain trough. Sunroof assembly 20 is of a dual pane variety. Thus, both panes 22 and 24 can be opened to retracted positions to allow significantly increased sunlight and ventilation access through an opening within a stationary vehicle roof 40. As will be discussed in detail hereinafter, sunroof assembly 20 is optimally operated by control system 32 which is, in turn, activated by the conveniently accessible switch assembly 30.

The various pane positions are as follows. As can best be observed in FIG. 2a, front and rear panes 22 and 24, respectively, are nominally disposed in a covering or closed position substantially flush and sealed to roof 40. Referring to FIG. 2b, rear pane 24 is slidably movable to a retracted position below an inside surface 42 of roof 40. Rear pane 24 can also be moved to any intermediate position between its covering and retracted positions. In this operating condition, front pane 22 can be left in its covering position. FIG. 2c shows rear pane 24 left in its covering position while front pane 22 is moved to a partially retracted position defined by a majority of front pane 22 being angled above rear pane 24. It should be noted that an open position is defined as including both the retracted and vent positions as applied to the front and rear panes, respectively 22 and 24, and the sunshades 26 and 28 (see FIG. 3e).

As can be observed in FIG. 2d, front pane 22 is pivoted to a vent position having a rear edge 44 tilted above roof 40. Rear pane 24 remains in its covering position. FIG. 2e depicts rear pane 24 slidably moved to its retracted position below roof 40 while front pane 22 is located in its partially retracted and vent position. FIG. 2f shows both front and rear panes, respectively 22 and 24, pivoted to their vent positions. Referring to FIG. 2g, rear pane 24 is slid to its retracted position below roof 40 and front pane 22 is in its fully retracted position substantially above roof 40. This position serves to minimize head room intrusion while allowing maximum roof opening over the front and rear seats. As can be observed in FIG. 2h, front pane 22 remains in its covering position and rear pane 24 is pivoted to its vent position.

An operating mechanism is used to operatively move and retain panes 22 and 24 as well as sunshades 26 and 28. The operating mechanism employed with the present invention is of a conventional variety such as that disclosed within U.S. Pat. Nos. 5,184,870 entitled "Raisable-Sliding Roof of Shallow Construction for Motor Vehicles" which issued to Bauhof on Feb. 9, 1993, and 4,671,564 entitled "Ventilating Device for a Roof Opening of Vehicles" which issued to Sumida et al. on Jun. 9, 1987, the disclosures of which are incorporated by reference herewithin. The operating mechanism includes the necessary guide rails, drain troughs, motors, cables, linkages and casings. However, various modifications were made to the guide rails and drain trough in order to optimize the dual sunroof construction of the present invention.

FIGS. 3a through 3e show the various operating positions of front sunshade 26 and rear sunshade 28. In FIG. 3a, front and rear sunshades 26 and 28 are disposed in their functional or closed locations juxtapositioned below their respective front and rear panes 22 and 24. FIG. 3b discloses rear sunshade 28 slidably moved to its stowed or open position below roof 40. This allows sunlight to enter through either rear pane 24 (see FIG. 3a) or the opening within roof 40. Referring to FIG. 3c, rear sunshade 28 is moved to an intermediate position while front sunshade 26 is slidably moved to a partially retracted position. Thus, front and rear sunshades 26 and 28, respectively, block sunlight from entering the area below rear pane 24 (see FIG. 3a). As can be seen in FIG. 3b, rear sunshade 28 is fully stowed while front sunshade 26 is moved to an intermediate position. FIG. 3e shows both front and rear sunshades 26 and 28, respectively, slidably moved to their respective stowed positions below roof 40.

Referring to FIGS. 9–11 and 15, a preferred embodiment of a drain trough 500 is movably mounted proximate to a rear edge 502 of each pane 22 and 24. However, drain trough 500 may additionally extend around other portions of the periphery of each one or both panes 22 and 24. In this embodiment, the pane preferably slides but does vent. Drain trough 500 has a C-shaped clasping portion 510 which is encapsulation molded, through conventional PVC or RIM processes, upon a peripheral portion of the substantially horizontal surfaces and rear edge 502 of each pane. A first leg 504 integrally extends angularly below clasping portion 510 and joins with a bottom portion 506. A second leg 508 outwardly and upwardly extends from bottom portion 506 thereby forming a substantially U-shaped or truncated V-shaped cross sectional construction. A flange seal 512 is adhesively mounted upon a distal end of second leg 508 and a compression seal 514 is adhered to clasping portion 510 for sealing to the adjacent roof 40 and casing. While drain trough 500 is preferably molded as a single elastomeric member, first leg 504 may alternately be separately formed from metal, a polymeric resin, or a composite material, and then screwed or adhered to clasping portion 510, or directly to a pane. Of course, drain trough 500 may be defined by a variety of other shapes as long as it is movably attachable to a pane. Clasping portion 510 may alternately be flush molded upon a pane.

Figure 16:
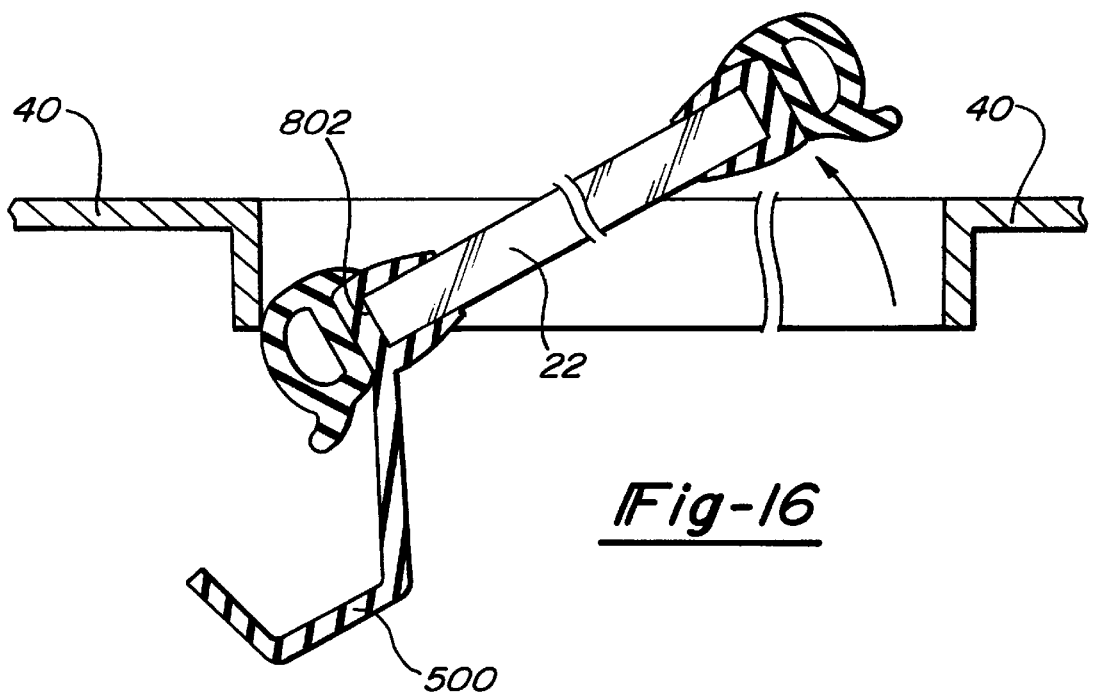
FIG. 16 is a longitudinal sectional view, taken along line 2—2 of FIG. 1, showing an alternate embodiment drain trough of the present invention in relation to a roof.

An alternate embodiment drain trough 500 is shown if FIG. 16. This drain trough 500 is attached to a front edge 802 of each pane 22 and 24 so as not to intrude within the passenger compartment and to allow for venting movement of each pane. Panes 22 and 24 may also slide within a single set of guide rails.

A first preferred embodiment, as shown in FIGS. 12a–12c, employs a first set of guide rails 61 having an access slot 62 and ramp 63 therein. A forward pivotable coupling means 64 attached to front sunshade 26 is sized larger than slot 62 and, thus, slides along an upper branch 85 of guide rails 61. A rearward pivotable coupling means 66 is attached to front sunshade 26 and is sized to enter slot 62 and slide down ramp 63 and along a lower branch 68 of guide rail 61 when in its covering position. A coupling means (not shown) is attached to rear sunshade 28 for slidable engagement with a second set of guide rails 69. This embodiment prevents an aesthetically undesirable step between front and rear sunshades 26 and 28, respectively. The appearance is further enhanced by crowning the sunshades.

Figure 13:
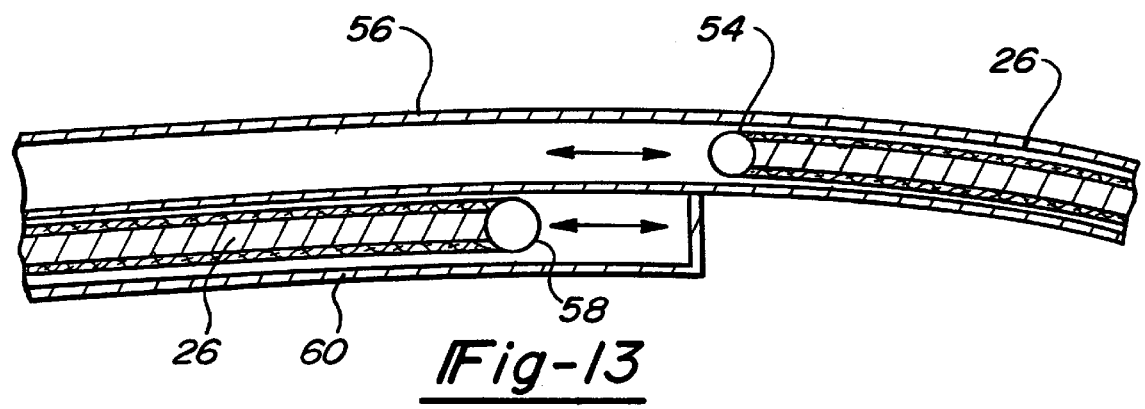
FIG. 13 is a longitudinal sectional view, also taken along line 2—2 of FIG. 1, showing the preferred embodiment sunshades in relation to second preferred embodiment sets of guide rails of the present invention sunroof assembly.

Referring to FIG. 13, the second preferred embodiment of the present invention sunroof assembly provides a coupling means 54 connected to front sunshade 26 for slidable engagement within a first set of guide rails 56. Similarly, a second coupling means 58 is connected to rear sunshade 26 for providing slidable engagement within a substantially parallel second set of guide rails 60. Moreover, synchronous movement between sunshades 26 and 28 is not required within the preferred embodiments to avoid undesirable collisions.

Figure 14:
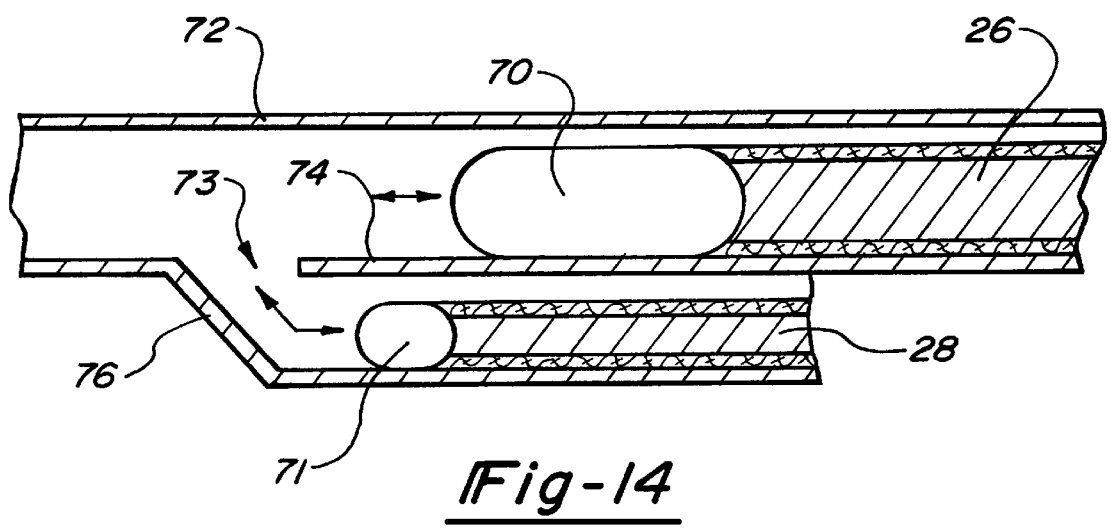
FIG. 14 is a longitudinal sectional view, also taken along line 2—2 of FIG. 1, showing the preferred embodiment sunshades in relation to an alternate embodiment set of guide rails of the present invention sunroof assembly.
Figure 15:
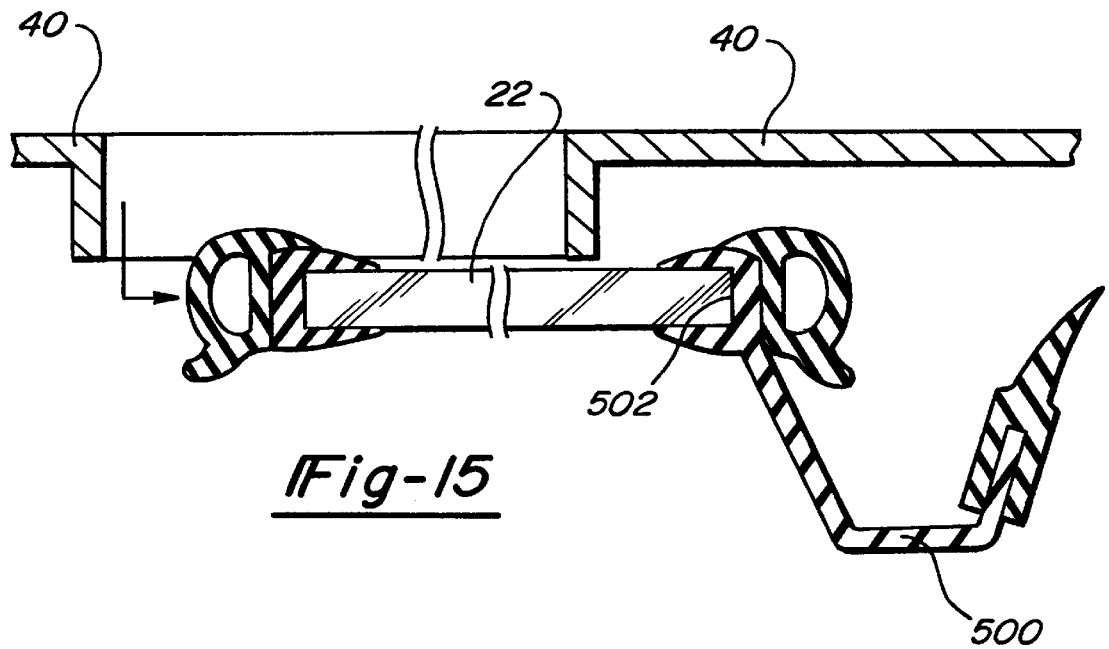
FIG. 15 is a longitudinal sectional view, taken along line 11—11 of FIG. 9, showing the preferred embodiment drain trough of the present invention in relation to a roof.

An alternate embodiment guide rail construction is shown in FIG. 14. In this embodiment, a coupling means 70 and 71 for both front and rear sunshades, respectively 26 and 28, are slidably engaged within a single set of guide rails 72. Guide rails 72 include an access slot 73 disposed within a median surface 74 and a ramp 76 positioned adjacent to slot 73 for downwardly directing a substantially identically sized forward and rearward set of coupling means 71 of rear sunshade 28 for movement to the retracted position thereof below roof 40 (see FIG. 2g). Coupling means 70 of front sunshade 26 is larger than coupling means 71 of rear sunshade 28. Therefore, coupling means 70 can slide above slot 73 and ramp 76 for movement to their retracted position below roof 40.

Figure 4:
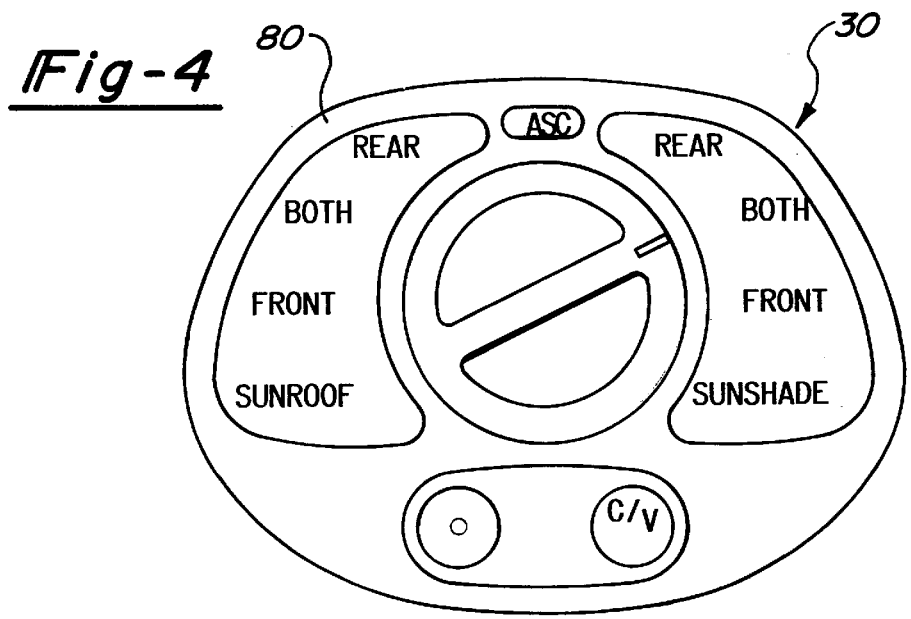
FIG. 4 is a true elevational view showing a preferred embodiment of an electrical switch assembly employed in combination with the sunroof assembly of the present invention of FIG. 1.
Figure 5:
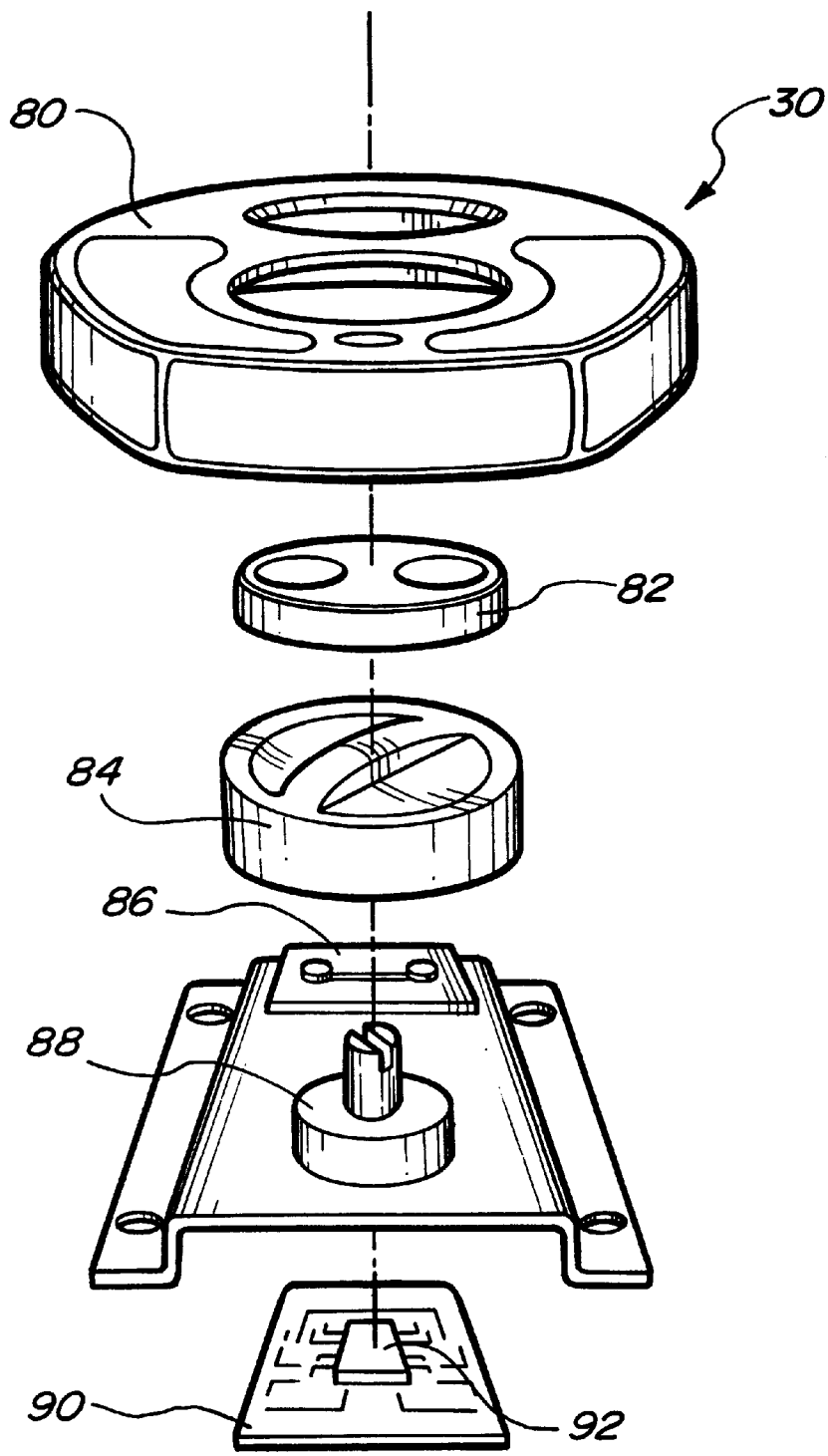
FIG. 5 is an exploded perspective view showing the preferred embodiment of the electrical switch assembly of FIG. 4.

The physical construction of the preferred embodiment of electrical switch assembly 30 can best be observed in FIGS. 4 and 5. Switch assembly 30 is mounted upon a headliner below a front header panel. Switch assembly 30 has a polymeric aesthetic bezel 80 with function selection graphics (eg., "sunroof," "front," "both," etc.) affixed thereto. Bezel 80 further has a pair of apertures through which project a polymeric rocker button 82 and a polymeric knob 84. Button 82 pivotably actuates a rocker switch 86 between an open "O", and a closed or vent "C/V" position. Knob 84 is rotatably engagable with a rotary dial switch 88. Rotary dial switch 88 is movable between sunroof-front, sunroof-both, sunroof-rear, ASC, sunshade-rear, sunshade-both and sunshade-front positions. The ASC position correlates to an all open/all closed position for both front and rear sunroofs and sunshades. Rocker switch 86 and rotary dial switch 88 are electrically connected to a printed circuit board 90 containing a microprocessor-based CPU 92. Switch assembly 30 is electrically coupled to printed circuit board 90 via multiplex wiring. However, conventional discrete wiring, metal traces or even fiber optic signal transmitting means can be employed. An alternate aesthetic embodiment of switch 30 of the present invention is shown in FIG. 8.

Figure 6:
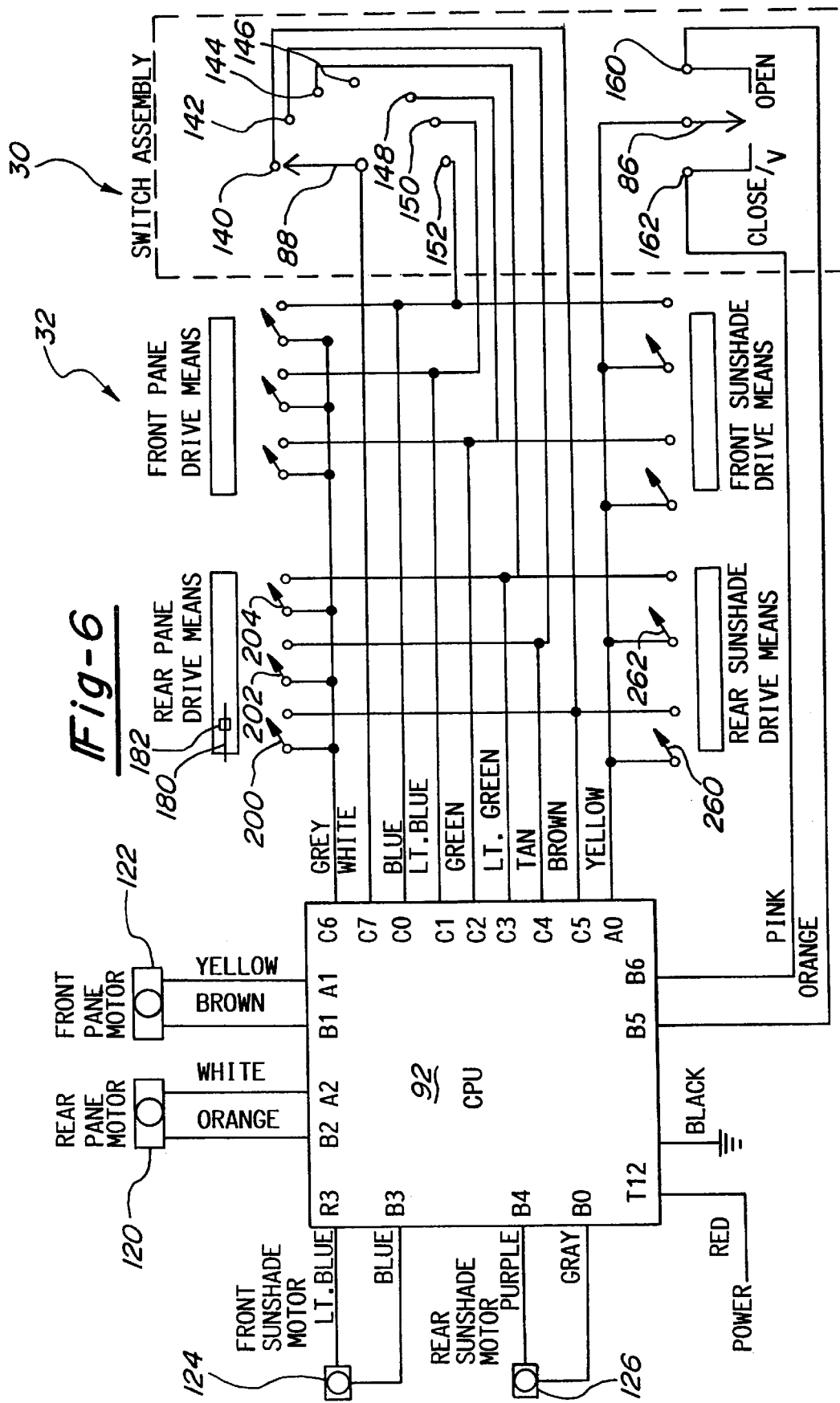
FIG. 6 is an electrical circuit diagram of the preferred embodiment control system employed to operate the sunroof assembly of the present invention of FIG. 1.

In one preferred embodiment of the present invention, electric switch assembly 30 serves to selectively operate control system 32 in order to cause the operating mechanism to move panes 22 and 24 as well as sunshades 26 and 28. Referring to FIG. 6, CPU 92 is preferably an off-the-shelf 24 pin PIC16C57 microchip which can be purchased from Digi-key of Thief Riverfalls, Minn. CPU 92 can selectively energize a rear pane motor 120, a front pane motor 122, a front sunshade motor 124 and a rear sunshade motor 126. Rotary dial switch 88 is electrically connected to CPU 92 for selectively switching between sunroof-front position 140, sunroof-both position 142, sunroof-rear position 1 44, ASC position (no current flow through the switch) 146, sunshade-rear position 148, sunshade-both position 150 and sunshade-front position 152. Rocker switch 88 is also electrically connected to CPU 92 so as to be energizable between open position 160 and closed/vent position 162.

A plurality of limit switches or other position sensing devices are electrically connected to CPU 92. In coordination with the limit switches, and as part of the operating mechanism to move the panes and sunshades, a drive means includes a cable 180 having a magnetic device 182 attached thereto. Rear pane motor 120 is of a DC fractional horsepower type having a pinion gear which drives cable 180. Cable 180 concurrently serves to move rear pane 24 (see FIG. 2b). A similar drive means is used for the other pane and the sunshades. In cooperation therewith, a first limit switch 200 senses a full closed or covering position of rear pane 24. A second limit switch 202 senses the vent position of rear pane 24. Furthermore, a third limit switch 204 senses the full open or retracted position of rear pane 24. These limit switches are operatively changed from a closed position to an open position and vice versa, by movement therepast of magnetic device 182. The limit switches associated with the front pane drive means operate in the same manner as that described for the rear pane drive means.

Magnetic device 182 associated with rear sunshade drive means serves to operate a fourth limit switch 260 and a fifth limit switch 262. Limit switch 260 senses the full open or stowed position of rear sunshade 28 (see FIG. 3b). Limit switch 262 senses the full closed or functional position of rear sunshade 28. Front sunshade drive means and limit switches act in a similar manner.

CPU 92 is controlled by software written in assembly language. A flow chart of this software is shown in FIG. 7. The assembly language codes referencing various circuits and pins shown in FIG. 6 is listed in the following Table 1.

TABLE 1

```
DEVICE PIC16C57,RC_OSC,WDT_OFF,PROTECT_OFF
            RESET       START
;
;OUTPUTS
;************************
;
FglassO     =   ra.1    ;Yellow
FglassC     =   rb.1    ;Brown
RglassO     =   ra.2    ;White
RglassC     =   rb.2    ;Orange
FshadeO     =   ra.3    ;Lt Blue
FshadeC     =   rb.3    ;Blue
Rshadeo     =   rb.4    ;Pup
RshadeC     =   rb.0    ;Grey
MUXa        =   rc.6    ;Grey
MUXb        =   rc.7    ;White
MUXc        =   ra.0    ;Yellow
;
;INPUTS
;************************ *
;*                        *
;*  a grounded bit = 1    *
;*  at the chip           *
;************************ *
SW0         =   rc.0    ;blue     front glass front limit/sun front
SW1         =   rc.1    ;ltblue   front glass mid limit/sun both
SW2         =   rc.2    ;green    front glass rear limit/sun rear
;
SW3         =   rc.3    ;ltgrn    rear glass front limit/sun front
SW4         =   rc.4    ;tan      rear glass mid limit/sun both
SW5         =   rc.5    ;brown    rear glass rear limit/sun rear
;
;
SWopen      =   rb.5    ;org      main switch open
SWclose     =   rb.6    ;pink     main switch close
;
BANK0       =   08h
BANK3       =   09h
BANK2       =   0Ah
set         =   10h
base        =   11h
count       =   12h
debounce    =   13h
Aport       =   05h
Bport       =   06h
motordelay  =   14h
modeREG     =   15h
temp        =   16h
portC       =   07h     ;port c
roofpos     =   0Bh
switchpos   =   0Ch
shadpos     =   0Dh
mask        =   0Eh
timer       =   0Fh
;   BANK3   SUNSHADE
RRclFFcl    =   10h     ;RR = rear,cl=closed,FF=front,op=open,md
RRclFFmd    =   11h     ;xx = not at any switch
RRclFFop    =   12h
RRmdFFcl    =   13h
RRmdFFmd    =   14h
RRmdFFop    =   15h
RRopFFcl    =   16h
RRopFFmd    =   17h
RRopFFop    =   18h
RRxxFFcl    =   19h     ;USED ONLY FOR THE SUNROOF
RRxxFFmd    =   1Ah
RRxxFFop    =   1Bh
RRclFFxx    =   1Ch
RRmdFFxx    =   1Dh
RRopFFxx    =   1Eh
;ascSW  ds  1
;
;
;
;
START       org     0
            mov     FSR,#0000 0000b
```

TABLE 1-continued

```
            mov     !ra,#00000000b      ;1=input
            mov     !rb,#01100000b      ;0=output
            mov     !rc,#00111111b
            clrb    FglassO
            clrb    FglassC
            clrb    RglassO
            clrb    RglassC
            clrb    FshadeO
            clrb    FshadeC
            clrb    RshadeO
            clrb    RshadeC
            mov     BANK0,#0000 0000b
    ;       mov     BANK1,#0010 0000b
            mov     BANK2,#0100 0000b
            mov     BANK3,#0110 0000b
    ;       call    shortdelay
;************************************************
;SHADESETUP
            mov     FSR,bank3           ;set bank 3
    ;               RRR FFF
    ;               xx omc omc
            mov     RRclFFcl,#00 001 00b  ;used for both shade &roof
            mov     RRclFFmd,#00 001 000b
            mov     RRclFFop,#00 001 100b
            mov     RRmdFFcl,#00 000 001b
            mov     RRmdFFmd,#00 000 000b
            mov     RRmdFFop,#00 000 100b
            mov     RRopFFcl,#00 100 001b
            mov     RRopFFmd,#00 100 000b
            mov     RRopFFop,#00 100 100b
            mov     mask,#00111111b      ;mask data input from sw
;************************************************
; ROOF SETUP
            mov     FSR,BANK2
    ;               RRR FFF
    ;               xx omc omc
            mov     RRclFFcl,#00 001 00b  ;used for both shade &roof
            mov     RRclFFmd,#00 001 010b
            mov     RRclFFop,#00 001 100b
            mov     RRclFFxx,#00 001 000b
            mov     RRmdFFcl,#00 010 001b
            mov     RRmdFFmd,#00 010 010b
            mov     RRmdFFop,#00 010 100b
            mov     RRmdFFxx,#00 010 000b
            mov     RRopFFcl,#00 100 001b
            mov     RRopFFmd,#00 100 010b
            mov     RRopFFop,#00 100 100b
            mov     RRopFFxx,#00 100 000b
            mov     RRxxFFcl,#00 000 001b
            mov     RRxxFFmd,#00 000 010b
            mov     RRxxFFOp,#00 000 100b
            ljmp    page1
;************************************************
page1       org     513
swoft       jb      SWopen,swoff
            jb      SWclose,swoff
MAIN        jb      SWopen,run
            jb      SWclose,run
:loop       djnz    timer,:loop
            jmp     MAIN
RUN         call    scanSWpos
            csne    switchPOS,100000000b  ;ASC pos.
            jmp     bothshad
            cjbe    switchpos,#00000111b,bothshad
            cja     switchpos,#00000111b,bothroof
    ;       jmp     bothroof
            jmp     Main
;************************************************
;
scanSWpos   mov     FSR,bank3           ;switch pos
            setb    MUXa
            setb    MUXb
            setb    MUXc
            clrb    MUXa
            mov     timer,#10
            clrb    MUXa
:loop       djnz    timer,:loop
            mov     switchpos,portc
            and     switchpos,MASK
```

TABLE 1-continued

```
                setb    MUXa
                setb    MUXa
                ret
scanSHpos       mov     FSR,bank3       ;sunshade pos
                setb    MUXa
                setb    MUXb
                setb    MUXc
                clrb    MUXc
                mov     timer,#10
                clrb    MUXc
:loop           djnz    timer,:loop
                mov     shadpos,portc
                and     shadpos,MASK
                setb    MUXc
                setb    MUXc
                ret
scanSRpos       mov     FSR,bank2       ;roof pos
                setb    MUXa
                setb    MUXb
                setb    MUXc
                clrb    MUXb
                mov     timer,#10
                clrb    MUXb
:loop           djnz    timer,:loop
                mov     roofpos,portc
                and     roofpos,MASK
                setb    MUXb
                setb    MUXb
                ret
;****************************************************
;shortdelay     mov     mbtordelay,#160 ;motor running delay
;
;:Mdelay        mov     set,#1          ;if count =05 then set=1
;                                       ;if count =50 then set=16
;                                       ;if count =250 then set=83
                mov     count,05        ;must be 5,50 or 250       ;1
                mov     base,#250                                  ;1
;:offset        djnz    set,:offset     ;loop set times           48
;:loop          dec     base            ;loop 250 times          250
;               nop                     ;+1 to count             250
;               nop                     ;+1 to count             250
;               nop                     ,+1 to count             250
;               nop                     ;+1 to count             250
;               nop                     ;+1 to count             250
;               jnz     :loop           ;                        500
;               ;                       first loop              2000
;               djnz    count,:loop     ;loop 5 times           9995
;       ;       djnz    motordelay,:mdelay
;               ret                     ;loop 50 times         99950
;                                       ;loop 250 times       499750
;;IF COUNT IS 5 THEN TOTAL TICKS = 10000    @10Mhz =.001 sec
;;IF COUNT IS 50 THEN TOTAL TICKS = 100000  @10Mhz = .01 sec
;;IF COUNT IS 250 THEN TOTAL TICKS =500001  @10Mhz = .05 sec
;****************************************************
;;
;****************************************************
;;
;bounceA        mov     FSR,bank0
;               mov     set,#16         ;if count =05 then set=1
;                                       ;if count =50 then set=16
;                                       ;if count =250 then set=83
;               mov     count 150       ;must be 5,50 or 250       ;1
;               mov     base,#250                                  ;1
;:offset        djnz    set,:offset     ;loop set times           48
;:loop          dec     base            ;loop 250 times          250
;               nop                     ;+1 to count             250
;               nop                     ;+1 to count             250
;               nop                     ;+1 to count             250
;               nop                     ;+1 to count             250
;               nop                     ;+1 to count             250
;               jnz     :loop           ;                        500
;               ;                       first loop              2000
;               djnz    count,:loop     ;loop 5 times           9995
;
;               ret                     ;loop 50 times         99950
;                                       ;loop 250 times       499750
;;IF COUNT IS 5 THEN TOTAL TICKS =10000     @10Mhz =.001 sec
;;IF COUNT IS 50 THEN TOTAL TICKS =100000   @10Mhz = .01 sec
;;IF COUNT IS 250 THEN TOTAL TICKS =500001  @10Mhz = .05 sec
;;****************************************************
;;
;;****************************************************
EndALL          clrb    FglassO
                setb    rshadeC
                clrb    FglassC
                clrb    RglassO
                clrb    RglassC
                clrb    FshadeO
                clrb    FshadeC
                clrb    RshadeO
                clrb    RshadeC
                jmp     swoff
test            setb    fglassc
                setb    rglassc
                jmp     test
;****************************************************
bothshad        jb      SWopen,:open
                jb      SWclose,:close
                jmp     endALL
:open           call    scanSWpos                         ;asc pos
                cje     switchpos,#0000 0000b,:both       ;asc pos
                and     switchpos,#0000 0111b
                cje     switchpos,#0000 0001b,:onlyfront
                cje     switchpos,#0000 0010b,:both
                cje     switchpos,#0000 0100b,:onlyrear
;               jmp     test
                jmp     endAll
:both           call    scanSHpos
                AND     shadpos,#00 000 100b
                cje     shadpos,RRmdFFop,:endF
                setb    FshadeO
:rear           call    scanSHpos
                AND     shadpos,#00 100 000b
                cje     shadpos,RRopFFmd,:endR
                setb    RshadeO
                call    scanSWpos                         ;asc pos
                cje     switchpos,#0000 0000b,bothroof    ;asc pos check
                jmp     bothshad
:endF           clrb    FshadeO
                clrb    FshadeC
                call    scanSWpos
                jmp     :rear
:endR           clrb    RshadeO
                clrb    RshadeC
                call    scanSWpos                         ;asc pos check
                cje     switchpos,0000 0000b,bothroof     ;asc pos check
                jmp     bothshad
:onlyfront      call    scanSHpos
                AND     shadpos,#00 000 100b
                cje     shadpos,RRmdFFop,endAll
                setb    FshadeO
                jmp     bothshad
:onlyrear       call    scanSHpos
                AND     shadpos,#00 100 000b
                cje     shadpos,RRopFFmd,endAll
                setb    RshadeO
                jmp     bothshad
:close          call    scanSRpos
                AND     roofpos,#00 001 001b
                cje     roofpos,RRclFFcl,:OK
                call    scanSWpos                         ;asc pos
                cje     switchpos,#0000 0000b,bothroof    ;asc pos
                jmp     endAll
:OK             call    scanSWpos                         ;asc pos
                cje     switchpos,#0000 0000b,:Cfront     ;asc pos
                call    scanSHpos
                and     switchpos,#0000 0111b
                cje     switchpos,#0000 0001b,:Conlyfront
                cje     switchpos,#0000 0010b,:Cfront
                cje     switchpos,#0000 0100b,:Conlyrear
                jmp     endAll
;
:Cfront         call    scanSHpos
                AND     shadpos,#00 000 001b
                cje     shadpos,RRmdFFcl,:endCF
                setb    FshadeC
:Crear          call    scanSHpos
                AND     shadpos,#00 001 000b
```

TABLE 1-continued

```
              cje    shadpos,RRclFFmd,:endCR
              setb   RshadeC
              jmp    bothshad
:endCF        clrb   FshadeO
              clrb   FshadeC
              jmp    :Crear
:endCR        clrb   RshadeO
              clrb   RshadeC
              jmp    bothshad
:Conlyfront   call   scanSHpos
              AND    shadpos,#00 000 001b
              cje    shadpos,RRmdFFcl,:endCF
              setb   FshadeC
              jmp    bothshad
:Conlyrear    call   scanSHpos
              AND    shadpos,100 001 000b
              cje    shadpos,RRclFFmd,:endCR
              setb   RshadeC
              jmp    bothshad
;************************************************
asc   ;       setb   ascSW
      ;       sb     ascSW
      ;       jmp    endAll
      ;       setb   FglassC
      ;       jmp    asc
              jmp    bothshad
;************************************************
rearroof      jmp    endAll
;************************************************
;************************************************
bothroof      jb     SWopen,:open
              jb     SWclose,:checkR        ;goto vent or close
              jmp    endALL
:checkR       call   scansRpos
              AND    roofpos,#00 001 001b
              cje    roofpos,RRclFFcl,:vent
              cje    roofpos,RRxxFFcl,:vent
;             cje    roofpos,RRclFFxx,:vent
              jmp    :close
:vent         call   scanSWpos
              and    switchpos,#0011 1000b
              cje    switchpos,#0010 0000b,:onlyfrontv
              cje    switchpos,#0001 0000b,:ventboth
              cje    switchpos,#0000 1000b,:onlyrearv
              jmp    endAll
:ventboth     call   scanSRpos
              AND    roofpos,#00 110 000b
              cje    roofpos,RRmdFFxx,:endRv
              cje    roofpos,RRopFFxx,:endRv
              setb   RglassO
:ventF        call   scanSRpos
              AND    roofpos,#00 000 110b
              cje    roofpos,RRxxFFmd,:endFv
              cje    roofpos,RRxxFFop,:endFv
              setb   FglassO
              jmp    :vent
:endRv        clrb   RglassO
              jmp    :ventf
:endFv        clrb   FglassO
              mov    timer,Aport
              AND    timer,#00000110b
              cje    timer,#00000000b,endAll
              jmp    :vent
:onlyrearv    call   scanSRpos
              AND    roofpos,#00 110 000b
              cje    roofpos,RRmdFFxx,endAll
              cje    roofpos,RRopFFxx,endAll
              setb   RglassO
              jmp    :onlyrearv
:onlyfrontv   call   scanSRpos
              AND    roofpos,#00 000 110b
              cje    roofpos,RRxxFFmd,endAll
              cje    roofpos,RRXXFFop,endAll
              setb   FglassO
              jmp    :onlyfrontv
:open         call   scanSWpos              ;asc pos check
              cje    switchpos,#0000 0000b,:front    ;asc pos check
              and    switchpos,#0011 1000b
              cje    switchpos,#0010 0000b,:onlyfront
              cje    switchpos,#0001 0000b,:front
              cje    switchpos,#0000 1000b,:onlyrear
              jmp    endAll
:front        call   scanSRpos              ;inter lock so that
              AND    roofpos,#00 100 000b   ;the front will not
              cse    roofpos,RRopFFxx       ;move until the rear
              jmp    :rear                  ;sunroof is open
              call   scanSRpos
              AND    roofpos,#00 000 100b
              cje    roofpos,RRxxFFop,:endF
              setb   FglassO
:rear         call   scanSRpos
              AND    roofpos,#00 100 000b
              cje    roofpos,RRopFFxx,:endR
              setb   RglassO
              call   scanSWpos              ;asc pos check
              cje    switchpos,#0000 0000b,bothshad   ;asc pos check
              jmp    bothroof
:endF         clrb   FglassO
              cirb   FglassC
              jmp    :rear
:endR         cirb   Rglasso
              cirb   RglassC
              jmp    bothroof
              mov    timer,Bport
              AND    timer,#00000110b
              cje    timer,#00000000b,endAll
              jmp    bothroof
:onlyfront    call   scanSRpos              ;inter lock so that
              AND    roofpos,#00 100 000b   ;the front will not
              cse    roofpos,RRopFFxx       ;move until the rear
              jmp    bothroof               ;sunroof is open
              call   scanSRpos
              AND    roofpos,#00 000 100b
              cje    roofpos,RRxxFFop,endAll
              setb   FglassO
              jmp    bothroof
:onlyrear     call   scanSRpos
              AND    roofpos,#00 100 000b
              cje    roofpos,RRopFF#,endAll
              setb   RglassO
              jmp    bothroof
:close        jnb    SWclose,endAll
              call   scanSWpos              ;asc pos check
              cje    switchpos,#0000 0000b,:Cfront    ;asc pos check
              call   scanSWpos
              and    switchpos,#0011 1000b
              cje    switcbpos,#0010 0000b,:Conlyfront
              cje    switchpos,#0001 0000b,:Cfront
              cje    switchpos,#0000 1000b,:Conlyrear
              jmp    endAll
:Cfront       call   scanSRpos
              AND    roofpos,#00 000 001b
              cje    roofpps,RRXXFFcl,:endCF
              setb   FglassC
:Crear        call   scanSRpos              ;inter lock so that
              AND    roofpos,#00 000 001b   ;the front will not
              cse    roofpos,RRxxFFcl       ;move until the rear
              jmp    :close                 ;sunroof is open
              call   scanSRpos
              AND    roofpos,#00 001 000b
              cje    roofpos, RRclFFxx,:endCR
              setb   RglassC
              jmp    :close
:endCF        clrb   FglassO
              clrb   FglassC
              jmp    :Crear
:endCR        clrb   RglassO
              clrb   RglassC
              mov    timer,Bport            ;the motor port
              AND    timer,#00000110b       ;
              cje    timer,#00000000b,:okk  ;is the motor running
              jmp    :close
:okk          call   scanSWpos              ;asc pos check
              cje    switchpos,#0000 0000b,bothshad   ;asc pos check
              jmp    endAll
:Conlyfront   call   scanSRpos
              AND    roofpos,#00 000 001b
              cje    roofpos,RRxxFFcl,endAll
```

TABLE 1-continued

```
            setb    FglassC
            jmp     :close
:Conlyrear  call    scanSRnos
            AND     roofpos,#00 001 000b
            cje     roofpos,RRclFFxx,endAll
            setb    RglassC
            jmp     :close
;**************************************************************
;**************************************************************
frontroof   jmp     endall
;**************************************************************
;
;
;**************************************************************
;**************************************************************
;**************************************************************
;**************************************************************
;**************************************************************
;**************************************************************
;**************************************************************
;
```

In the aforementioned embodiment, the switch selectively energizes the control system and operating mechanism as follows. When both sunroof panes are in their covering positions and the rear sunroof open switch position is selected, the rear pane and rear sunshade open simultaneously to the position shown in FIGS. 2b and 3b. When both panes are closed and the front pane switch open position is selected, the front pane moves to the position shown in FIG. 2c and front sunshade moves simultaneously to the position shown in FIG. 3c. When both panes are in a covering position and the front pane vent switch position is selected, the front pane vents to the position shown in FIG. 2d while front sunshade simultaneously moves to the position of FIG. 3c. When front pane is either in a retracted or vented position (see FIGS. 2e and 2d, respectively), and the rear sunroof open switch position is selected, the front sunshade is already disposed at the position of FIG. 3c such that front and rear sunshades simultaneously move to the positions shown in FIG. 3e and rear pane moves to the position of FIG. 2e.

When both panes are in a covering or closed position and the both sunroof open switch position is selected, the rear panes and front and rear sunshades move simultaneously; the rear sunshade moves to the position of FIG. 3e and then front sunshade moves to the position also shown in FIG. 3e; the rear pane then moves to the position of FIG. 2g, after which, front pane slides to the retracted position also shown in FIG. 2g. When both sunroofs are covering and the rear sunroof vent switch position is selected, the rear sunshade moves to the position of FIG. 3b and rear pane moves to the position shown in FIG. 2h. When both panes are closed or covering and the sunroof-both vent switch position is selected, rear sunshade and front sunshade simultaneously move to the positions in FIG. 3e while front and rear panes simultaneously move to the position shown in FIG. 2f. The closing operations are in reverse order of the opening operations discussed above.

With the addition of a current sensing capability in the control system, both sunroof panes can be powered simultaneously to their retracted positions. The current sensing capability allows for the device to check for current rises that would indicate a potential collision or binding of the sunroof operating mechanism. With this current sensing capability, the ASC switching position would allow for coordinated and simultaneous sliding movement of both sunroof panes and both sunshades. A time dependency feature can also be added to the software to allow for express open or close features.

While the preferred embodiments of a sunroof assembly and control system therefore have been disclosed, it will be appreciated that various modifications may be made without departing from the present invention. For example, any control means, whether mechanical, electrical or software driven may be employed to operate the dual sunroof pane and dual sunshade system of the present invention. Furthermore, other software programs may be used in combination with the electrical circuit and switch disclosed above. Other electrical, mechanical or optical sensing means may be used with the control system. The novel control system, drain trough and sunshade guide rail constructions previously disclosed herein may be employed with dual or single sunroof systems. Moreover, both sunroof panes may be retracted to positions below the roof or above the roof. Also, many other manual or powered operating mechanisms and actuators can be used to slide, pivot or otherwise move each or all of the sunroof panes and sunshades. For example, solenoid, rack and pinion, and fluid pressure means may be employed to drive the panes and sunshades. The guide rail embodiments discussed heretofore may also be used to guide a pair of sunroof panes in addition to or instead of sunshades. Various materials have been disclosed in an exemplary fashion, however, a variety of other materials may of course be employed. It is intended by the following claims to cover these and any departures from the disclosed embodiments which fall within the true spirit of this invention.

The invention claimed is:

1. A sunroof assembly for use in an automotive vehicle, said sunroof assembly comprising:

a movable panel having at least one edge, said panel being tiltable from a substantially flush roof position to a vent position, a portion of said panel being located above said substantially flush roof position when said panel is in said vent position;

a drain trough having a clasping portion mounted upon said panel adjacent said edge, said drain trough being movable with said panel;

said drain trough having an outwardly opening and substantially truncated V cross sectional shape extending from said clasping portion, said substantially truncated V cross sectional shape including:

(a) a first leg extending from said clasping portion, (b) a bottom portion coupled to said first leg and located in a plane substantially parallel to a plane of said panel, and (c) a second leg upstanding from said bottom portion, said first and second legs extending angularly outwardly from said bottom portion;

said first and second legs of said drain trough being outwardly angled relative to each other, said drain trough being made from a substantially solid and flexible polymeric resin.

2. The sunroof assembly of claim 1 wherein said clasping portion is mounted upon at least one surface of said panel and has said first leg integrally attached to said clasping portion.

3. The sunroof assembly of claim 2 wherein said first leg is integrally molded in combination with said clasping portion.

4. The sunroof assembly of claim 3 wherein said clasping portion has a polymeric substantially C-shaped cross sectional shape encapsulated as a single piece around two surfaces and an edge of said panel.

5. The sunroof assembly of claim 1 further comprising:

a second movable panel; and a second drain trough mounted upon and cooperatively moving with at least one edge of said second movable panel.

6. The sunroof assembly of claim 2 further comprising:

a roof of said automotive vehicle; and a compression seal mounted upon said clasping portion for sealing against said roof.

7. The sunroof assembly of claim 1 further comprising:

a roof of said automotive vehicle;

a flange seal mounted upon said second leg for sealing against said roof.

8. In combination, a drain trough and a sunroof assembly of an automotive vehicle, said comprising:

a movable panel having a front edge, said drain trough being mounted proximate at least said front edge of said panel;

a section of said drain trough having a substantially truncated V cross sectional shape, a majority portion of said drain trough being flexible; and an operating mechanism operably sliding said panel between a covering position and an open position, said drain trough being movable in concert with said panel, said panel being, pivotable between a substantially flush roof position and a tilted vent position wherein a portion of said panel is located above said flush roof position.

9. The drain trough of claim 8 wherein said drain trough is encapsulated upon said at least one edge of said panel.

10. A drain trough assembly for use in a sunroof assembly of an automotive vehicle having first and second movable panels independently movable relative to each other by electric motor powered drive mechanisms, said drain trough assembly comprising:

a first substantially flexible polymeric drain trough having a clasping portion for mounting on at least one edge of said first panel, an outwardly opening and substantially truncated V cross sectional shape extending from said clasping portion, said substantially truncated V cross sectional shape being defined by: (a) a first leg extending from said clasping portion, (b) a bottom portion coupled to said first leg disposed in a plane substantially parallel to a plane of said first panel, and (c) a second leg upstanding from said bottom portion;

said first and second legs extending from said bottom portion, said first and second legs being outwardly angled relative to each other; and a second substantially flexible drain trough for mounting on and moving with at least one edge of said second panel, said drain troughs being movable independent of each other.

11. The assembly of claim 10 wherein said first panel is rearwardly slidable between a covering position and a retracted position internal to said automotive vehicle.

12. The assembly claim 10 wherein said first and second drain troughs are made from solid polymeric resin encapsulated upon said at least one edge of said respective panels.

* * * * *

UNITED STATES PATENT AND TRADEMARK OFFICE
CERTIFICATE OF CORRECTION

PATENT NO. : 5,961,177
DATED : October 5, 1999
INVENTOR(S) : Mark A. Caye et al

It is certified that error appears in the above-identified patent and that said Letters Patent is hereby corrected as shown below:

Column 5, line 25, "85" should be -- 65 --.

Column 6, line 29, "1 44" should be -- 144 --.

Column 7, line 29, "Iimit" should be -- limit --.

Column 8, line 17, "SHADESETUP" should be -- SHADE SETUP --.

Column 8, line 20, "00b" should be -- 001b --.

Column 8, line 33, "RRclFFcl#00" should be -- RRclFFcl,#00 --.

Column 8, line 33, "00b" should be -- 001b --.

Column 8, line 43, "RRxxFFOp,#00" should be -- RRxxFFop,#00 --.

Column 8, line 47, "swoft" should be -- swoff --.

Column 8, line 57, "Main" should be -- MAIN --.

Column 9, line 27, "mbtordelay,#160" should be -- motordelay,#160 --.

Column 9, line 32, "count,05" should be -- count,#05 --.

UNITED STATES PATENT AND TRADEMARK OFFICE
CERTIFICATE OF CORRECTION

PATENT NO. : 5,961,177
DATED : October 5, 1999
INVENTOR(S) : Mark A. Caye et al

It is certified that error appears in the above-identified patent and that said Letters Patent is hereby corrected as shown below:

Column 9, line 36, ",+1" should be -- ;+1 --.

Column 11, line 30, "scansRpos" should be -- scanSRpos --.

Column 11, line 61, "roofpos,RRXXFFop,endAll" should be -- roofpos,RRxxFFop,endAll --.

Column 12, line 19, "cirb" should be -- clrb --.

Column 12, line 21, "cirb" should be -- clrb --.

Column 12, line 21, "Rglasso" should be -- RglassO --.

Column 12, line 22, "cirb" should be -- clrb --.

Column 12, line 35, "roofpos,RRopFF#,endAll" should be -- roofpos,RRopFFxx,endAll --.

Column 12, line 46, "roofpps,RRXXFFcl,:endCF" should be -- roofpos,RRxxFFcl,:endCF --.

Column 12, line 53, "roofpos,RRclFFxx,:endCR" should be -- roofpos,RRclFFxx,:endCR --.

Column 13, line 5, "scanSRnos" should be -- scanSRpos --.

UNITED STATES PATENT AND TRADEMARK OFFICE
CERTIFICATE OF CORRECTION

PATENT NO. : 5,961,177
DATED : October 5, 1999
INVENTOR(S) : Mark A. Caye et al

It is certified that error appears in the above-identified patent and that said Letters Patent is hereby corrected as shown below:

Column 15, line 14, after "said" insert -- combination --.

Column 16, line 25, after "assembly" insert -- of --.

Signed and Sealed this

Twenty-second Day of May, 2001

Attest:

NICHOLAS P. GODICI

*Attesting Officer*     *Acting Director of the United States Patent and Trademark Office*